Dec. 5, 1944.   F. G. PURINTON ET AL   2,364,388
METHOD OF MOLDING DECORATED PLASTIC ARTICLES
Filed Sept. 1, 1942
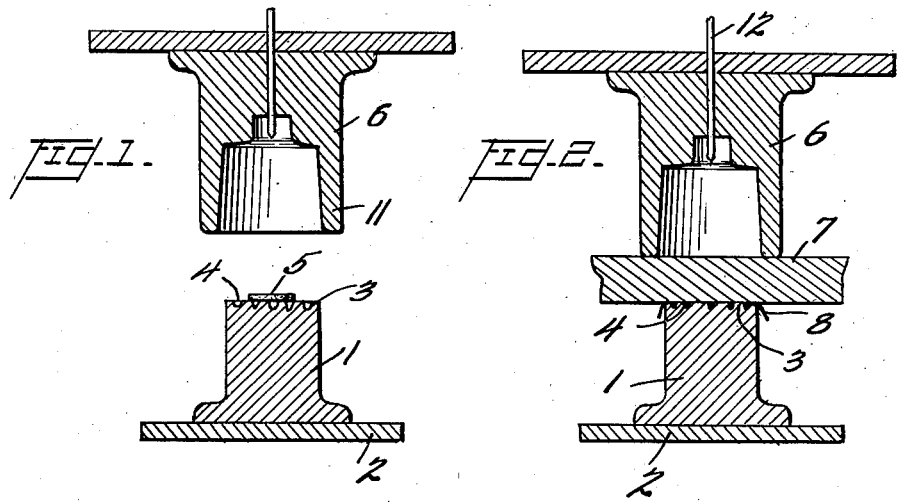
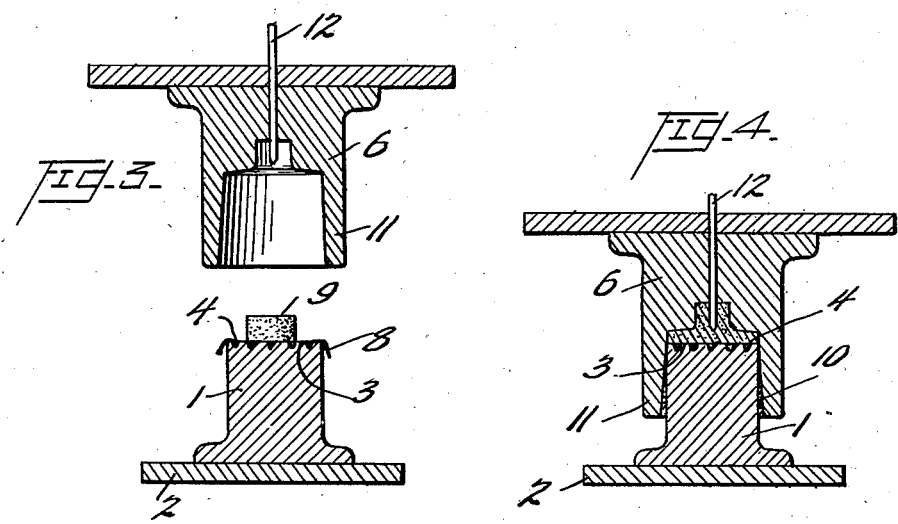
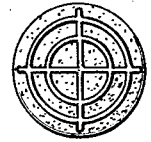
Inventors
Forrest G. Purinton
William A. Zwiebel
By Parker Cook
Attorney Patented Dec. 5, 1944

2,364,388

UNITED STATES PATENT OFFICE 2,364,388

METHOD OF MOLDING DECORATED PLASTIC ARTICLES

Forrest G. Purinton and William A. Zwiebel, Waterbury, Conn., assignors to The Patent Button Company, Waterbury, Conn., a corporation of Connecticut Application September 1, 1942, Serial No. 456,930

5 Claims. (Cl. 18—61)

Our invention relates to a new and useful method for making small decorated plastic articles such as buttons and the like, and has for an object to provide a method wherein two types of plastic are used, preferably of different colors, so that the face of the article, such as a button, may have a fanciful design, trade-mark or insignia of a different color molded thereon and forming an integral part thereof.

Still another object of the invention is to provide a method especially adapted for use in manufacturing buttons, bottle tops, cosmetic boxes and similar articles, wherein the decorated face will stand out in bold relief, and be sharp cut in appearance; and wherein the design may be made of, say, a colored opaque or translucent plastic and the background be a plastic of any desired contrasting or harmonizing color.

Still another object of the invention is to provide a method of producing a decorated plastic button or the like, preferably utilizing a translucent urea plastic for the decorative feature, so that even though there is a fine film of this plastic on the face of the button, the film will be so thin it will be transparent and not affect the plastic background.

Still another object of the invention is to provide a method for producing a decorated plastic article wherein a rapidly flowing thermosetting urea plastic may be used for the decorative portion on the face and a phenolic condensation product such as "Bakelite" be used for the base or body of the button.

Still another object of the invention is to provide a method wherein there is what might be termed a double molding, single setting operation, so that the decorative plastic—that is, the urea used on the face, becomes a welded part of the base of the button to thus produce a biplastic button wherein the decorated portion will be clear, sharp and an integral part of the body of the button.

Still another object of the invention is to produce a button with a double molding and single setting operation to thus save time in the manufacture of the button and at the same time produce a button that may be pleasing in appearance, strong in service and economical to manufacture.

As is well known to those skilled in the art, where decorated plastic articles are manufactured such as buttons, the ordinary practice is to impress the design in the face of the button and then afterwards fill the design with pigment and wipe off the surplus, so that the contrasting color of the pigment will remain in the impressions to thus produce the desired contrast.

Another object, therefore, of the invention is to produce a button wherein the plastic making up the design becomes an integral part of the face of the button and may be raised slightly or to a greater degree with relation to the face of the button, thus doing away with the filling and wiping operations and also producing a button wherein the design is much clearer cut, upstanding, much more durable and of higher quality.

Another object is to use the cheaper unattractive material for the body or bulk of the article and only a small amount of the more expensive and more attractive material for the design on the face.

With these and other objects in view, the invention consists in certain new and novel steps illustrating one manner in which my method may be carried out.

In the drawing showing a button and a diagrammatic way in which the method may be carried out for molding the same, Fig. 1 is a diagrammatic view of an upper and lower die with a urea pill in place on the lower or impression or face die;

Fig. 2 is a similar view but showing the press closed with an intermediate heated piece of metal between the dies for forcing the urea pill (melted) into the impressions cut in the face of the lower die;

Fig. 3 shows the press again opened and the intermediate plate removed and a phenol plastic pill placed on the face die preparatory to the closing of the press;

Fig. 4 is a diagrammatic view with the press closed and the upper die also removing any excess plastic from the periphery of the button;

Fig. 5 is a side elevation of a button made according to my method; and

Fig. 6 is a top plan view of the same.

At the outset it is to be understood that the drawing is wholly diagrammatic for illustrating the simplest form of carrying out the method (with the exception of Figs. 5 and 6) and it is to be remembered that the method in commercial use can be carried out with multiple cavity dies so that a number of pills, say three hundred, can be deposited on the three hundred receptive dies by trays, after which the intermediate pieces may be inserted, removed, further pills inserted, the press closed, the plastic cured, the press opened and the buttons removed; the method being the same with the exception that the articles are made in quantities, rather than as illustrated, one at a time.

Referring now for the moment to Fig. 1, there is diagrammatically shown the lower or what I call the face or impression die 1, which will be secured to a face plate 2 of the press. The die, of course, is heated to a temperature of from approximately 300° up, as at this temperature the urea will flow and even set if allowed to.

The face of the die 3 may be flat or slightly concave, as later mentioned, while in the face will be engraved the desired insignia, indicia, trademark or fanciful design 4. Preferably, although not necessarily, some of the lines may extend from the center of the button towards its periphery, as in this way any excess plastic may be more readily forced to the sides or extruded, as will be shortly explained.

On this die is to be placed a small thin pill 5 of a urea thermosetting plastic. The size of the pill will be predetermined so that the amount of surplus material will be reduced to a minimum.

I have found that a translucent urea plastic pill will give excellent results for the reason that any thin film left across the face of the die and consequently on the face of the button is not noticeable because the film is so thin and the material being translucent has very little hiding power. In fact, where a black or red plastic is used for the button proper, as will be shortly mentioned, the thin film left on the face is in no way apparent.

Possibly if a heavy opaque urea were used, the thin film might have a slight hiding power, although this is questionable, due to the thinness of the film; but on the other hand, by using the translucent urea, the material has enough opacity to make the lines show distinctly white while the film itself will not show.

In the drawing I have shown the upper die 6 in which the button proper is molded cooperating with the lower die 1, but this die 6 does not come in contact with the lower die in the first operation, as is the usual method in molding articles. Instead, there is inserted an intermediate metal piece 7 so that when the press is heated and closed and the two dies approach each other, the intermediate piece 7 will force the plastic of the urea pill 5 well down into the die cavity and fill up the engraved lines which are to form the desired design or insignia in the face of the plastic button.

The intermediate plate 7 may be a hard steel or alloy and may be coated with chromium so that the plastic of the urea pill will not stick thereto, and this intermediate piece will be heated and always kept up to the desired temperature. Thus, when the press is closed the urea pill will melt and flow within the depressions formed in the bottom of the die cavity while any excess, of which there will be very little, will be extruded as at 8.

As heretofore mentioned, there may be an exceedingly thin film across the bottom of the die cavity and across what will be the face of the button, but due to the fact that this film is so thin and preferably of a translucent urea plastic, it cannot be perceived by the eye, so that it does not in any way affect the beauty of the face of the button.

I have found that to melt the urea plastic pill so that it will run and fill the lines in the bottom of the die cavity will generally not take over from one to two seconds.

In this molding operation the design on the face die and the intermediate piece form a flash type of cavity so that the excess material, as heretofore mentioned, is extruded at the edge, allowing the two opposing surfaces to come together except possibly for the very thin film above mentioned.

Before the plastic has cured or set—that is, right after the closing of the press, the press is again opened, the intermediate piece 7 removed and a plastic pill 9, preferably a phenolic condensation plastic which may be of any desired color and a predetermined size, is placed on the die 1 in which the urea plastic still remains and the press again closed, this time the die 6 descending its full stroke, as may be seen in Fig. 4. The button proper, of course, conforms in shape to the cavity in the upper die.

The excess material 10 from the phenol plastic pill, as well as any slight excess remaining from the urea pill, will be cut or broken off by the skirt 11 of the die 6.

The die will have the pin 12 to form a resultant chamber or bore for a tack fastener (not shown) so that the button may be fastened or attached to its article.

If a flash die is not used for the second operation, the two dies will come together as much as the material and the phenol will permit, and, of course, the overall depth of the button will vary as much as the pill varies; however, if the multiple cavity dies are used, it will probably be advisable to use flash type molding, although a type of cavity such as a semipositive might be used in which there would be first a flashing out of a certain amount of material after which the opening through which this flashing occurs might be closed as the dies approach each other so that the cavity then becomes one of the positive type.

In any and all instances, however, the method is the same in that first the urea pill is placed in a die cavity, heated so that it will flow but not set, forced well down into the cavity by an intermediate piece between the two dies, after which the intermediate piece is removed and a second plastic pill, preferably a phenolic condensation plastic, is placed on the die, the press closed and the two plastics allowed to set to produce an integral structure as the two plastics weld and cure in the same operation.

If the lower or face die has a slightly concave surface, then the intermediate piece should have a bottom surface conforming to the contour of the die face as it is desirable to squeeze or press all the urea from the die face except that which fills up the depressions formed in the face of the die.

Also, as heretofore mentioned, what thin film remains is so thin that it is not apparent to the naked eye.

After the button has been cured, say in one minute, the press is opened and the pin 12 may be used as an ejecting pin. The button may later be placed in a tumbling barrel to remove any minute fin that might be around the periphery of the button.

It is, of course, desirable that the pressure applied to the intermediate piece while between the two dies be predetermined and controllable and also the pressure between the two dies when the intermediate piece is not interposed should be equally predetermined and controllable.

Therefore, if a multiple die cavity is used, it should be mounted in such a way that the press load will be equally divided among the intermediate pieces. This can be done by backing up the pieces with a piece of rubber and the confining the rubber between all four edges as well as in back, so that when the press is closed it will flow very slightly but enough to equalize the pressure on all the pieces.

As heretofore mentioned, if the decorative portion has lines running across the face of the button, the urea will probably be extruded mostly at the ends of the lines; however, if desired, minute lines (not shown) may be formed in the face of the lower die cavity, such as very fine hair lines, which would extend towards the sides and thus help to reduce any film on the face of the button.

From the foregoing it will be seen that I have provided a method for what might be termed a double molding, single cure of plastic articles wherein the face may be of a decorative nature with a contrasting colored plastic and wherein the decorative portions may be produced with high fidelity, truly reproducing the lines that are cut in the face of the die by an engraver.

The inexpensive phenol plastic for the base or body of the button may have high impact strength and low flow and may be of any desired background color, whereas the more expensive urea plastic may be formulated for high flow and to meet high appearance requirements.

It will be understood that the method may be carried out in a press with but one upper and lower die with all operations fully mechanized, or the method may be carried out in large standard presses with multiple cavity dies and multiple cavity intermediate pieces manually manipulated.

It will also be understood that whereas we have diagrammatically illustrated and described intermediate pieces, the method contemplates any other practical way of applying heat and pressure to the urea plastic while on the face die, such as a descending heated plunger the face of which will conform to the face of the face or impression die with the exception, of course, that there will be no raised portions on the face of the plunger to correspond with the depressions cut in the face die, as the object is to fill the depressions within the face die and displace any excess plastic from the face of the die.

It is conceivable that this plunger might be moved in and out of registry with the face die to perform its function or on the other hand, the face die might be moved in and out of registry with the plunger preceding mating of the face die with the body die.

Finally, we do not wish to be limited to the two types of plastic mentioned, as other plastics or combinations of plastic might be used with equally as good results.

Having thus described our invention, what we claim as new and desire to secure by Letters Patent is:

1. The method of molding decorated plastic articles in a press having a face die and a body die, the face die having a design forming depression cut therein, placing a plastic charge between the dies, placing an intermediate member between the said dies, partially closing the press so that the said dies will contact the intermediate member, subjecting the charge to heat and pressure to fill the depression in the face die and displace any surplus plastic therefrom, quickly opening the dies, removing the intermediate member, placing a charge of plastic of different color between the dies, the first mentioned charge of plastic still remaining in the depressions of the face die, closing the dies, subjecting the plastics to heat and pressure and allowing the two plastics to unite and cure, opening the dies and removing the decorated plastic article from the dies.

2. The method of molding decorated plastic articles in a press having face die and a body die, the face die having a design forming depression cut therein, placing a plastic charge between the dies, placing an intermediate heated member between the said dies, partially closing the press so that the said dies will contact the intermediate heated member, subjecting the charge to heat and pressure to fill the depression in the face die and displace any surplus plastic therefrom, opening the dies before the plastic is cured, removing the intermediate heated member, placing a charge of plastic of different color between the dies, the first mentioned charge of plastic still remaining in the depressions of the face die, closing the dies, subjecting the plastics to heat and pressure and allowing the two plastics to unite and cure, opening the dies and removing the decorated plastic article from the dies.

3. The method of molding decorated plastic articles which comprises placing a plastic of selected color on a face forming die which die has a design forming depression cut therein, placing a heated metal intermediate piece over said die, applying pressure to said piece to thus fill up the die cavity and displace any surplus plastic, removing the intermediate piece and placing a second plastic of different color on said face die in the design depressions on which still remains the first mentioned plastic, subjecting the die with both plastics to a cooperative body forming die, the said body forming die removing any flash from about the periphery of the first mentioned die, applying heat and pressure to thus mold the article in the cooperative body forming die and allowing the two plastics to unite into an integral unit and to simultaneously cure, separating the dies and removing the article therefrom.

4. The method of molding decorated plastic articles which comprises placing a plastic of selected color on a face forming die which die has a design forming depression cut therein, placing a heated metal intermediate piece over said die, applying pressure to said piece to thus fill up the die cavity only and displace any surplus plastic, removing the intermediate piece and placing a second plastic of different color on said face die in the design depressions of which still remains the first mentioned plastic, subjecting the die with both plastics to a cooperative body forming die, the said body forming die removing any flash from about the periphery of the first mentioned die, applying pressure to thus mold the article in the cooperative body forming die and allowing the two plastics to unite into an integral unit, separating the dies and removing the article therefrom.

5. The method of molding decorated plastic articles between a face forming and body forming die, which consists of placing a charge of a desired plastic on the face forming die which has a design forming depression cut therein, placing an intermediate heated metal spacer between the dies, closing the dies with the intermediate spacer in place, the bottom of the intermediate spacer conforming to the contour of the face forming die but not to the design forming depressions to displace any surplus plastic from the face forming die, opening the dies, removing the intermediate spacer and placing a second charge of plastic of different characteristics on said face die, subjecting the face die with its plastic filled depressions to a body forming die, the said body forming die having a skirt to close the flash opening and remove any flash from about the periphery of the first mentioned die, applying heat with the pressure to thus mold the article in the cooperative body forming die, allowing the two plastics to simultaneously cure, opening the dies and removing the decorated article therefrom.

FORREST G. PURINTON.
WILLIAM A. ZWIEBEL.